Feb. 18, 1969    M. J. GINSBERG ET AL    3,428,450

ALLOYS FOR BRAZING SILICON NITRIDE MATERIAL

Filed May 12, 1965

INVENTORS:
RICHARD H. KROCK
MICHAEL J. GINSBERG

BY
*Robert Levine*
ATTORNEY

United States Patent Office 3,428,450
Patented Feb. 18, 1969

3,428,450
ALLOYS FOR BRAZING SILICON
NITRIDE MATERIAL
Michael J. Ginsberg and Richard H. Krock, Peabody,
Mass., assignors to P. R. Mallory & Co. Inc., Indianapolis, Ind., a corporation of Delaware
Filed May 12, 1965, Ser. No. 455,179
U.S. Cl. 75—170  2 Claims
Int. Cl. C22c 19/00

ABSTRACT OF THE DISCLOSURE

A nickel based alloy containing titanium and silicon for brazing together silicon nitride parts.

---

The present invention relates to alloys which act as fillers in brazing together articles of silicon nitride material, and produce strong, refractory bonds.

Massive silicon nitride is characterized by its hardness refractoriness, high elastic modulus and tensile strength, chemical inertness, thermal shock resistance, high electrical insulation resistance and comparatively low density. It may be produced by firing silicon powder compacts at 1400–1600° C. in an atmosphere of nitrogen or ammonia. Very little dimensional change occurs during fabrication so, generally, expensive grinding is not required to obtain accurate pressed powder articles. However, the nitriding time increases rapidly as the thickness of the article is increased; thus, for relatively thick sections, the nitriding time may be so extensive that it is not economically feasible. In such cases it may be much more economical to make the article from several thin sections brazed together. To accomplish this, a brazing alloy is required which will wet the silicon nitride at a temperature below the sublimation point of the latter and, on cooling, will result in a tenacious bond between the nitride sections.

Therefore, it is an object of the present invention to provide an alloy which is capable of brazing together pieces of silicon nitride material.

It is another object of this invention to provide an alloy of high refractoriness which is capable of brazing together parts of silicon nitride material.

Still another object of this invention is to provide an alloy capable of bonding together parts of silicon nitride with little interfacial reaction between the alloy and the nitride.

Further objects of this invention will become apparent from the following description considered in connection with the accompanying figures of the drawing, wherein like reference characters describe elements of similar function therein, and wherein the scope of the invention is determined from the dependent claims.

The drawings included are described as follows.

The sessile-drop method of determining the wetting qualities of a drop of liquid on a solid base is explained fully in an article written by B. S. Ellefson and N. W. Taylor, titled "Surface Properties of Fused Salts and Glasses: Parts I and II," published in the Journal of the American Ceramic Society, vol. 21 (6), 193–213 (1938).

Briefly, the test is based on determining the surface tension of a liquid drop by attaining equilibrium between the forces of gravity and surface tension. The illustrations show, graphically, the change in contact angle of sessile-drops of materials possessing various wetabilities.

Figure 1:
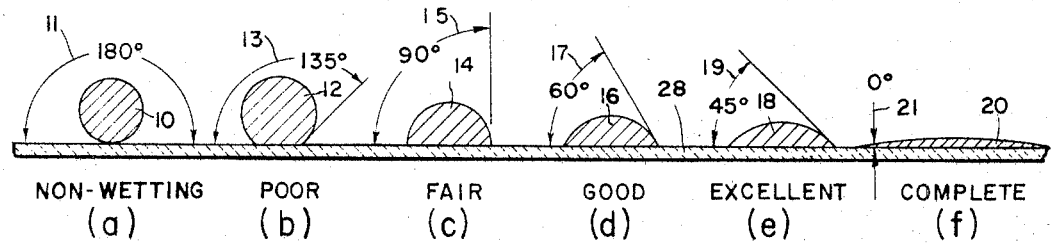
FIGURE 1 represents the wetting characteristics of a series of sessile-drops.

Referring to the drawings in detail, FIGURE 1 shows six sessile-drops on a base 28 of silicon nitride. (a) represents no wetting action by the drop 10 and the angle of contact 11 is 180 degrees. (b) indicates poor wetting by the drop 12 and a contact angle 13 of 135 degrees. (c) shows the drop 14 with a fair amount of wetting resulting in a contact angle 15 of 90 degrees. (d) indicates good wetting by the drop 16 for a contact angle 17 of 60 degrees. (e) shows excellent wetting by the drop 18 with a resulting contact angle 19 of 45 degrees. (f) shows complete wetting by the drop 20 with a contact angle 21 which is virtually zero.

Figures 2, 3:
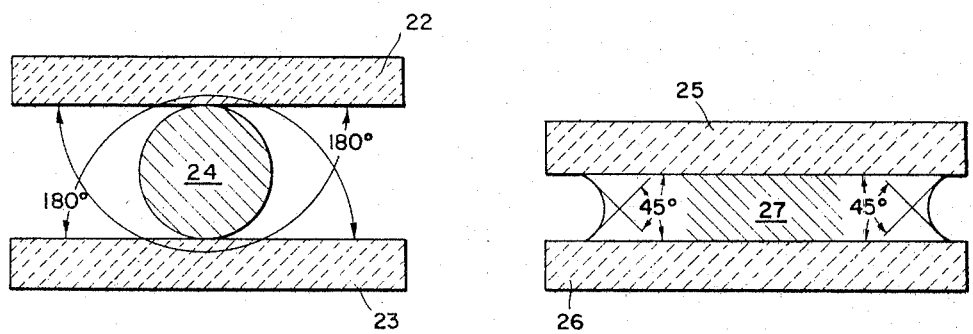
FIGURE 2 represents a joint made with a non-wetting brazing material.
FIGURE 3 represents a joint made with a well-wetting brazing material.

FIGURE 2 pictures two slabs of silicon nitride, 22 and 23, separated by a drop 24 of a substance which is non-wetting and indicated as such by the 180 degree contact angle shown. Actually, the drop 24 will be flattened slightly at both points of contact but this does not affect the conclusions appreciably.

FIGURE 3 shows similar silicon nitride slabs, 25 and 26, with a layer of high-wetting substance 27 in between, filling the capillary separation and displaying a wetting angle of about 45 degrees. This is considered an excellent braze.

The brazing alloys we discovered which have a surface atomic force without, or with very little, interface reaction consist of a binary alloy of nickel and titanium and a ternary alloy of nickel, titanium and silicon. Strictly speaking, the binary alloy can be used where a gross reaction between it and the silicon nitride can be tolerated. If the application is such that no gross reaction is acceptable, then the ternary alloy must be employed.

The binary alloy consists of 85 weight percent nickel and 15 weight percent titanium. A greater proportion of titanium results in the formation of $TiNi_3$, a brittle intermetallic phase, which degrades the bonding and reduces the mechanical strength of the joint. The bond reaches its maximum strength at about 15 weight percent titanium and becomes weaker as the amount of titanium is decreased from that value. The brazing temperature is about 1453° C. when no titanium is used and decreases to about 1287° C. when 15 weight percent is used. Thus, an alloy of 85 weight percent nickel and 15 weight percent titanium results in a joint of maximum strength at the lowest brazing temperature, both very desirable qualities. However, this alloy should not be used where interface reaction is objectionable or where the cost of the titanium would be considered prohibitive.

In brazing silicon nitride articles together using nickel-titanium, it was observed that as the proportion of titanium was increased that the gross reaction increased in violence. This was attributed to the affinity of the molten titanium-nickel for silicon and would be reduced by replacing part of the titanium with an equal amount of silicon thus tending to saturate the melt with silicon and reducing the movement of the silicon from the solid silicon nitride into the molten titanium-nickel-silicon.

Summarizing, the following generalities may be made:

(1) The maximum amount of titanium, 15 weight percent, results in the lowest melting point, 1287° C.

(2) The maximum amount of titanium, 15 weight percent, results in the maximum surface reaction between the silicon nitride and the molten alloy.

(3) The maximum amount of titanium, 15 weight percent, results in the maximum bond strength between the silicon nitride and the adjacent alloy.

(4) Replacing some of the titanium with an equal weight percent of silicon reduces the rate of surface reaction and decreases the bond strength but does not change the brazing temperature markedly.

(5) A satisfactory compromise between bond strength and interface reaction is achieved by an alloy comprising nickel weight 90 percent, titanium weight 7.5 percent, and silicon weight 2.5 percent.

It is apparent from the foregoing description that while several specific alloys have been described as our discovery, the embodiments are intended to be descriptive and not limiting in scope. It is recognized that various alloys may be prepared within the structures cited and encompassed by the limits of the described invention.

Having revealed this invention in complete detail, we make the following claims:

1. A brazing alloy consisting essentially of about 90 weight percent nickel, about 7.5 weight percent titanium, the remainder silicon.

2. A brazing alloy according to claim 1 wherein said alloy is further characterized by having a sessile-drop contact angle of less than 90° on a base of the material being brazed.

References Cited

UNITED STATES PATENTS

| | | | |
|---|---|---|---|
| 2,159,810 | 5/1939 | Lenz et al. | 75—170 |
| 2,899,302 | 8/1959 | Cape et al. | 75—170 |
| 3,311,470 | 3/1967 | Wakeman et al. | 75—170 |

RICHARD O. DEAN, *Primary Examiner.*